United States Patent Office 3,369,602
Patented Feb. 20, 1968

3,369,602
SECONDARY RECOVERY OF PETROLEUM
Wayne S. Fallgatter, Tulsa, John W. McGhee, Mannford, and Jack A. King, Tulsa, Okla., assignors to Cities Service Oil Company, Bartlesville, Okla., a corporation of Delaware
No Drawing. Filed Sept. 1, 1965, Ser. No. 484,442
7 Claims. (Cl. 166—9)

ABSTRACT OF THE DISCLOSURE

A process for improving the secondary recovery of oil utilizing surfactant waterflooding by injecting a weak salt solution of controlled concentration into the formation either before or after a surfactant slug is injected and finally sweeping the formation with an injected fresh water drive. The anion of the weak salt solution is preferably a chloride, citrate, sulfate, phosphate, carbonate, silicate or borate. The formation may be swept by a second weak salt solution of a 0.5 to 2.5% concentration in lieu of fresh water, if the concentration of the previously injected salt solution is within the same range.

---

This invention relates to the use of surfactants in waterflooding to increase the secondary recovery of crude oil from subterranean oil-bearing formations. More particularly, it relates to a particular surfactant waterflooding technique resulting in maximum oil recovery for any desired surfactant-injection water system.

In the secondary recovery of oil by waterflooding, the use of surfactants to alter the interfacial tension between water and oil and to alter the wetting behavior of these two fluids in contact with reservoir rock is well known. The surfactants used in waterflooding have been chosen generally for their ability to lower the interfacial tension between trapped or residual oil and the moving water front so that the residual oil can be more easily deformed and driven through the rock pore channels to a producing well.

In general, the results obtained from the use of surfactants dissolved in water have proved disappointing. The various factors to which these disappointing results have been attributed include (1) too low surfactant concentration, (2) inappropriate choice of surfactant type, (3) incompatibility between the surfactant employed and the oil or the reservoir water, (4) lack of consideration of the salt effect on oil yield and (5) too much surfactant absorption and loss on the rock surfaces.

It has now been discovered that the secondary recovery of oil may be substantially increased by employing a salt water-fresh water injection sequence in conjunction with surfactant waterflooding. Increased oil recovery has been obtained by employing a fresh water drive following the injection of a controlled concentration of salt solution either before or after the injection of a surfactant flood.

In conventional waterflooding in the field, brines are usually employed as the driving fluid. These brines may contain sodium chloride, magnesium chloride, calcium chloride, potassium chloride and other salts. If the concentration of salts in the brine exceeds about 10% by weight, it is necessary to condition the salt water slug ahead of or behind the surfactant slug in order to obtain good oil recovery. In some instances, adverse effects result from the presence of calcium and magnesium salts in the flood water. In accordance with the present invention, a slug of a more desirable salt type and concentration would be injected into the formation, followed by the surfactant slug and fresh water driving fluid. For this purpose, a sodium chloride solution can be considered as a conditioning salt slug when injected at some point during oil field brine injection since it differs in composition from the brine. The surfactants may be injected into the formation either at the start of secondary recovery waterflooding or at some subsequent time during the waterflooding. If the surfactant is to be injected into the formation at the start of the waterflooding, the nature of the original connate water in the formation determines the need for an initial salt slug prior to the fresh water drive. If the nature and concentration of the salts in original connate water were within the range of what would be acceptable in the initial salt flood called for by the present invention the original connate water may be considered to obviate the need for an initial salt water slug. If the nature and concentration of the salts in the original connate water are outside of acceptable range for the present invention, an initial salt slug must be injected into the formation.

In the event the surfactant injection is preceded by a conventional water flood, the injection water analysis will determine the necessity for conditioning the formation with a separate salt water slug. If the initial flood water is of a composition and concentration that would be acceptable in the initial salt slug of the present invention, the initial waterflood may be considered as the initial salt slug, obviating the need for an additional salt water conditioning slug prior to the fresh water drive. The concentration of the initial salt solution employed in accordance with the present invention may vary from about 0.5% to about 10% by weight of salt, with about 4% to 6% being generally preferred. The amount of the initial salt solution injected is not a critical feature of the invention. Generally, from about 1% to about 100% of the rock pore volume will be sufficient, although quantities outside this range may also be employed. The term "pore volume" is defined as the total volume of space available for fluids within the formation or core being treated.

The amount and concentration of the surfactant slug employed in accordance with the present invention likewise is not a critical feature of this invention. It is generally desirable to employ from about 0.1% to about 1.0% pore volume of the desired surfactant or blend of surfactants. The surfactant slug will normally comprise from about 1% to about 10% by weight of surfactant dissolved in either water or oil. The surfactant slug is commonly injected into the formation or core in a treatment size of from about 1% to about 40% pore volume.

An initial salt solution is normally injected into the formation being treated ahead of the surfactant slug. It is within the scope of the present invention, however, to inject the initial salt solution into the formation following the surfactant slug but prior to the injection of the fresh water driving fluid. The quantity of fresh water injected into the formation may vary over wide limits with from about 0.75 to about 2.5 pore volumes being generally sufficient for satisfactory results.

As an alternative to the use of a fresh water drive, it has been found that satisfactory oil recovery is obtained when salt solutions of very low concentration are used throughout. That is, a salt solution having a concentration of between 0.5% and about 2.5% by weight may be employed throughout, eliminating the need for a fresh water drive. The preferred concentration of such salt solutions are from about 1% to about 1.5% by weight of salt.

For the initial salt solution employed in accordance with the present invention, sodium chloride is the generally preferred salt. Other sodium salts, such as sodium citrate, sodium sulfate, sodium phosphate, sodium silicate, sodium carbonate and sodium borate, have also been employed. While the use of some of these salts have resulted in higher yields, the additional recovery is not generally sufficient to offset the cost advantage resulting from the use of sodium chloride. Various other salts such as aluminum chloride, ammonium chloride, magnesium sulfate, and potassium carbonate have also been employed in the salt solution of the present invention.

It is within the scope of the present invention to employ any of the numerous commercially available surfactants on the market. The surfactants may be of the anionic, cationic, or non-ionic type, or any mixture thereof, with anionic and non-ionic types generally preferred due to the normally higher costs of cationic surfactants. Surfactants of the various types are listed by Schwartz and Perry in "Surface Active Agents," published by Interscience Publishers, Inc. (1949).

Illustrative of the anionic surfactants that may be employed in the practice of the present invention are the petroleum sulfonates of the Bryton series sold by Bryton Chemical Company. Included in this series are Bryton F, molecular weight (M.W.) 467; Bryton Sherosope F–430, M.W. 430; and Bryton T, M.W. 500. Other illustrative anionic surfactants are the petroleum sulfonates of the Promor Series of Socony Mobil Oil Company, such as SS–6, M.W. 380; and SS–20, M.W. 415–30; Trepolate YLA, amine dodecyl benzene sulfonate of Treplow Chemical Company; and Aerosol OT, sodium dioctyl sulfosuccinate marketed by American Cyanamid Company.

Examples of suitable non-ionic surfactants are the ethoxylated fatty amines of the Ethomeen Series of Armour and Company. This series includes T–12, M.W. 365; T–15, M.W. 497; T–25, M.W. 937; and S–20, M.W. 719.

Other illustrative non-ionic surfactants include the Span, Tween and Brij products of Atlas Powder Company. The Span products are sorbitan fatty acid esters, while the Tween products are ethoxylated sorbitan fatty acid esters. Examples include the monolaurate, Span 20 and Tween 20; the monopalmitate, Span 40 and Tween 40; the monostearate, Span 60 and Tween 60; the monooleate, Span 80 and Tween 80; and the trioleate, Span 85 and Tween 85. The Brij products are ethoxylated fatty alcohols such as Brij 35, a polyoxyethylene lauryl ether. Other illustrative non-ionic surfactants that have been employed include Igepal CO-530, nonyl phenoxy polyoxyethylene ethanol, marketed by Antara Chemical; Trepoline L, lauric acid diethanolamide, marketed by Treplow Chemical Company; Ethomid RO-15, N,N-polyoxyethylene oleic acid amide, marketed by Armour Chemical; and Amine 220, 1-hydroxy-2-heptadecenyl glyoxalidine, marketed by Carbide and Carbon Chemicals.

An illustrative example of a suitable cationic surfactant is Arquad 2C, dicoco dimethyl ammonium chloride, marketed by Armour Chemical.

The surfactant slug that is injected into the reservoir may be either water-soluble or oil-soluble, or a mixture thereof. Oil-soluble surfactants may be injected into the reservoir dissolved in a slug of oil or suspended in a slug of water. Water-soluble surfactants are normally injected into the reservoir in water solution. As previously indicated, the surfactant slug may be injected initially at the commencement of waterflooding operations or may be added to a reservoir previously waterflooded. In order to further illustrate the present invention, a series of experiments were carried out in consolidated sandstone cores, 10" long, 2" in diameter employing Kentucky crude oil. The cores were filled with the crude oil and brine in the approximate volume ratio of 65:35. A conventional waterflood was then employed, using a 5% salt solution, until all of the obtainable oil was recovered. Since this waterflooding composition had an acceptable salt concentration, it was considered as the initial salt solution required by the present invention. In one series of runs, the surfactant slug was dissolved in Hawes crude oil from the Hardinsburg Sand, Butler County, Kentucky. The surfactants used were Promor SS–20 and Tween 85 in a weight ratio of 7 parts Promor SS–20 to 3 parts Tween 85. An 8% pore volume slug, having a weight ratio of 3.6% surfactants, was injected into the core, resulting in a total of 0.28% pore volume of active surfactants. Approximately 2 pore volumes of fresh water were used as the driving fluid. Table I as follows:

TABLE I

| Salt Type | Salt Concentration (wt. percent) | Treatment Size (percent p.v.) | Additional Oil Yield (percent p.v.) |
|---|---|---|---|
| NaCl | 5 | 75 | 16.2 |
| Na$_3$PO$_4$ | 2.16 | 75 | 20.7 |
| Na$_2$CO$_3$ | 5 | 75 | 21.0 |
| Na$_2$SO$_4$ | 5 | 75 | 18.6 |
| Na$_2$B$_4$O$_7$ | 3.2 | 75 | 18.2 |
| NaOH | 0.08 | 10 | 0 |
| NaOH | 0.08 | 100 | 0 |
| AlCl$_3$ | 5 | 75 | 0.2 |

An additional run was made using Promor SS–20 only in the surfactant slug. The concentration of the surfactant was 8.5% by weight and 4% pore volume of the surfactant slug was injected into the core, giving an active surfactant concentration on a 100% basis of 0.34%. The salt solution comprised NaCl in a concentration of 5% by weight. 62% pore volume of salt solution was injected into the formation following the procedure indicated above. The additional oil recovery was 14.1%.

A series of runs were also made in which the surfactant was dissolved in water. In this series of runs, the salt solution preceded the surfactant slug as in the runs indicated above. Approximately, 2 pore volumes of fresh water drive were again employed as the driving fluid following the surfactant addition. The surfactant employed in this series of runs was Promor SS–20 and Tween 85 in a 7:3 weight ratio. The concentration of surfactants in the slug was again 3.6% by weight. The size of the surfactant slug was approximately 7.8% pore volume. The results of this series of runs are shown in Table II that follows:

TABLE II

| Salt Type | Salt Concentration (wt. percent) | Treatment Size (percent p.v.) | Additional Oil Yield (percent p.v.) |
|---|---|---|---|
| NH$_4$Cl | 5 | 70 | 7.5 |
| NaCl | 5 | 75 | 20.6 |
| NaCl | 5 | 66 | 14.5 |
| CaCl$_2$ | 5 | 70 | 4.7 |
| Na$_3$PO$_4$ | 2.16 | 75 | 23.4 |
| MgSO$_4$ | 5 | 80 | 5.1 |
| K$_2$CO$_3$ | 5 | 77 | 11.2 |
| Na Citrate | 5 | 72 | 18.9 |
| Na Silicate | 5 | 63 | 17.1 |

Two runs were made in which Promor SS–20 alone was employed. The concentration of the surfactant was 3.6% by weight in water, and 7.8% pore volume of surfactant slug was injected into the core. In one run, 50% pore volume of a 10% by weight NaCl solution was employed. The additional oil recovery was 15.6% pore volume. In the other run, 60% pore volume of a 5% by weight NaCl solution was employed. The additional oil recovery was 13.6% pore volume. Two runs were also made employing Promor SS-20 and Igepal CO-530 in the weight ratio of 7:3. A total of 7.8% pore volume of a 3.6 weight percent of surfactant in water was injected into the core. In one run, 75% pore volume of a 5% NaCl solution was employed. The additional oil yield was 14.8%. In the other run, 10% pore volume of a 5% NaCl solution was employed. A total of 16.3% pore volume of additional oil was recovered from the core.

The beneficial effects of the salt water-fresh water sequence were demonstrated in a series of runs tabulated in Table III. The cores being treated contained Hawes crude oil. The surfactant blend contained 7 parts Promor SS-20 and 3 parts of Tween 85. A total of 7.8% p.v. of the surfactant slug was injected into the core, the concentration of surfactant in the slug being about 3.6 weight percent.

TABLE III

| Fluid ahead of Surfactant | Fluid Following Surfactant | Surfactant Dissolved in— | Additional Oil yield (percent p.v.) |
|---|---|---|---|
| Fresh Water | Fresh Water | Water | 3.5 |
| 3% NaCl | 3% NaCl | do | 3.3 |
| 5% NaCl | Fresh Water | do | 20.6 |
| Fresh Water | Fresh Water | Hawes Crude | 0.0 |
| 5% NaCl | 5% NaCl | do | 0.0 |
| 5% NaCl | 5% NaCl | do | 4.1 |
| 5% NaCl | Fresh Water | do | 16.2 |

In the following runs, a surfactant concentration of 10% by weight in Kerosene was employed, with a surfactant slug size of 1.65 p.v.

| | | | |
|---|---|---|---|
| Fresh Water | Fresh Water | Kerosene | 1.5 |
| Do | 5% NaCl | do | 2.4 |
| 5% NaCl | 5% NaCl | do | 4.7 |
| 5% NaCl | Fresh Water | do | 22.0 |

The following runs demonstrated the dilute salt water alternative to a fresh water drive. The surfactant employed was 7 parts Promor SS-20 and 3 parts Igepal CO-530, 3.6% by weight in fresh water, with a total surfactant treatment of 7.8% p.v.

| | | | |
|---|---|---|---|
| Fresh Water | Fresh Water | Water | 1.7 |
| 0.75% NaCl | 0.75% NaCl | do | 6.0 |
| 1.0% NaCl | 1.0% NaCl | do | 12.7 |
| 1.25% NaCl | 1.25% NaCl | do | 13.4 |
| 2.0% NaCl | 2.0% NaCl | do | 9.6 |
| 3.0% NaCl | 3.0% NaCl | do | 3.3 |
| 1.0% Na$_2$CO$_3$ | 1.0% Na$_2$CO$_3$ | do | 10.0 |
| 1.5% Na$_2$CO$_3$ | 1.5% Na$_2$CO$_3$ | do | 15.4 |
| 2.0% Na$_2$CO$_3$ | 2.0% Na$_2$CO$_3$ | do | 11.6 |
| 3.0% Na$_2$CO$_3$ | 3.0% Na$_2$CO$_3$ | do | 8.8 |

From this last series of runs, it can be seen that the additional oil recovery is adversely affected if the salt solution employed throughout has a concentration approaching 3% by weight.

The effect of the concentration of salt in the salt solutions was studied in a series of runs using Sandstone cores containing Kentucky crude oil in the manner indicated above. The surfactant blend employed was 7 parts Promor SS-20 and 3 parts Tween 85. Approximately 7.8% pore volume of surfactant slug was injected into the core, the concentration of surfactants being 4.2% by weight.

In these runs, the salt solution preceding the surfactant slug. The oil yield represents additional oil recovered after the conventional waterflooding operation with 5% by weight NaCl. The results of this series of runs are set forth in Table IV as follows:

TABLE IV

| Salt Type | Salt Concentration (Wt. Percent) | Treatment Size (Percent p.v.) | Additional Oil Yield (Percent p.v.) |
|---|---|---|---|
| NaCl | 5 | 20 | 15.5 |
| NaCl | 3 | 20 | 14.9 |
| NaCl | 1 | 20 | 15.1 |
| NaCl | 0.5 | 20 | 3.8 |
| Na$_3$PO$_4$ | 5 | 10 | 20.8 |
| Na$_3$PO$_4$ | 2.16 | 10 | 18.5 |
| Na$_3$PO$_4$ | 1 | 10 | 9.3 |
| Na$_2$CO$_3$ | 5 | 10 | 18.3 |
| Na$_2$CO$_3$ | 3 | 10 | 17.3 |
| Na$_2$CO$_3$ | 1 | 10 | 10.8 |

The effect of salt slug size was determined in a series of runs on Kentucky crude oil employing 7 parts Promor SS-20 and 3 parts Tween 85. The driving fluid was fresh water behind the surfactant flood. The salt solution was employed ahead of the surfactant flood. The results are shown in Table V as follows:

TABLE V

| Salt Type | Treatment Size (Percent p.v.) | Concentration (wt. percent) | Additional Oil Yield (p.v.) |
|---|---|---|---|
| Surfactant in Oil (7.8% p.v.-0.28% p.v. active surfactant employed) | | | |
| NaCl | 100 | 5 | 16.2 |
| NaCl | 20 | 5 | 15.5 |
| NaCl | 10 | 5 | 12.9 |
| NaCl | 5 | 5 | 10.1 |
| NaCl | 2 | 5 | 10.5 |
| NaCl | 1 | 5 | 7.0 |
| Na$_3$PO$_4$ | 75 | 2.16 | 20.7 |
| Na$_3$PO$_4$ | 10 | 2.16 | 18.5 |
| Na$_2$CO$_3$ | 75 | 5 | 21.0 |
| Na$_2$CO$_3$ | 10 | 5 | 18.3 |
| Surfactant in Water (7.8% p.v. treatment-0.28% active surfactant) | | | |
| NaCl | 40 | 5 | 11.7 |
| NaCl | 20 | 5 | 14.7 |
| NaCl | 10 | 5 | 13.0 |
| NaCl | 5 | 5 | 7.6 |
| Na$_3$PO$_4$ | 75 | 2.16 | 23.4 |
| Na$_3$PO$_4$ | 20 | 2.16 | 20.7 |
| Na$_3$PO$_4$ | 10 | 2.16 | 16.0 |
| Na$_3$PO$_4$ | 5 | 2.16 | 10.1 |

Two runs were made employing 7 parts Promor SS-20 and 3 parts Igepal CO-530. The total concentration of surfactants in water was 3.6% by weight, and a total treatment of 7.8% p.v. was injected into the cores. The results of these runs were as follows:

| | | | |
|---|---|---|---|
| NaCl | 75 | 5 | 14.8 |
| NaCl | 10 | 5 | 16.3 |

The effect on crude oil recovery of the position of the salt slug was studied in another series of runs in which 7 parts of Promor SS-20 and 3 parts Tween 85 were employed. The weight concentration of surfactants was about 3.6%. A total of 7.8% p.v. of the surfactant slugs was injected into the core. The results are set forth in Table VI as follows:

TABLE VI

| Salt Position Relative to Surfactant | Salt Treatment Size (percent p.v.) | Salt Concentration (wt. percent) | Additional Oil Yield (Percent p.v.) |
|---|---|---|---|
| Surfactant in Crude Oil | | | |
| NaCl, Before and After (ea.) | 100 | 5 | 7.4 |
| NaCl, Before | 10 | 5 | 12.9 |
| NaCl, After | 10 | 5 | 14.4 |
| NaCl, After | 200 | 5 | 12.3 |
| NaCl, One p.v. After | 10 | 5 | 7.5 |
| NaCl, Two p.v. After | 100 | 5 | 15.1 |
| NaCl, After 2 slugs | 15 | 5 | 10.2 |
| Na$_3$PO$_4$, Before | 10 | 2.16 | 18.5 |
| Na$_3$PO$_4$, After | 10 | 2.16 | 10.8 |

TABLE VI—Continued

| Salt Position Relative to Surfactant | Salt Treatment Size (percent p.v.) | Salt Concentration (wt. percent) | Additional Oil Yield (percent p.v.) |
|---|---|---|---|
| *Surfactant in Water* | | | |
| NaCl, Before and After (ea.) | 10 | 5 | 14.5 |
| NaCl, Before | 10 | 5 | 13.0 |
| NaCl, With | 10 | 5 | [1] 0.7 |
| NaCl, After | 10 | 5 | 16.5 |
| NaCl, 1 p.v. After | 10 | 5 | 5.4 |
| $Na_3PO_4$, Before | 10 | 2.16 | 16.0 |

Three additional runs were made employing Promor SS-20, 3.6 weight percent in water. A total of 7.8% p.v. of surfactant slug was injected into the core. The results were as follows:

| | | | |
|---|---|---|---|
| NaCl, Before | 60 | 5 | 13.6 |
| NaCl, Before | 60 | 10 | 15.6 |
| NaCl, After | 10 | 10 | 6.6 |

[1] Surfactant coagulated.

The present invention has also been successfully employed in additional test runs in which a variety of surfactants and crude oils have been employed. For example, test runs have been made employing the anionic surfactants Trepolate YLA and Aerosol OT. The cationic surfactant Arquad 2C has also been employed. Likewise, the non-ionic surfactants Trepoline L, Ethomid RO-15 and Amine 220 have been employed. Crude oils from Kentucky, Texas and Kansas fields have been successfully recovered in accordance with the present invention.

It will be understood that various changes in the details that have been described herein in order to explain the nature of this invention may be made by those skilled in the art within the principle and scope of the invention as expressed in the appended claims.

Therefore, we claim:

1. A process for improving the secondary recovery of oil from subterranean reservoirs penetrated by an injection well and a production well by means of surfactant waterflooding comprising:
   (a) injecting from about 1% to about 100% pore volume of a weak salt solution into the formation, said salt solution having from about 0.5% to about 10% by weight of salt;
   (b) injecting from about 1% to about 40% pore volume of a surfactant slug into the formation, said surfactant slug having from about 1% to 10% by weight of surfactant, the total amount of surfactant injected into the formation being from about 0.1% to 1.0% of the pore volume of the reservoir rock;
   (c) injecting from about 0.75 to about 2.5 pore volumes of fresh water driving fluid into the formation after the injection of said surfactant slug.

2. The process of claim 1 in which the weak salt solution is injected into the formation after the surfactant slug but prior to the injection of fresh water.

3. The process of claim 1 in which the salt is a sodium salt.

4. The process of claim 3 in which the salt is selected from the group consisting of chloride, citrate, sulfate, phosphate, carbonate, silicate and borate.

5. The process of claim 1 in which the salt is sodium chloride.

6. The process of claim 5 in which 20% pore volume of a 5% sodium chloride solution is injected into the formation, followed by an 8% pore volume surfactant slug containing 3.6% surfactant by weight and 2 pore volume of a fresh water drive.

7. A process for improving the secondary recovery of oil from subterranean reservoirs penetrated by an injection well and a production well by means of surfactant waterflooding comprising:
   (a) injecting from about 1% to about 100% pore volume of weak salt solution into the formation, said salt solution having from about 0.5% to 2.5% by weight of salt;
   (b) injecting from about 1% to about 40% pore volume of a surfactant slug into the formation, said surfactant slug having from about 1% to about 10% weight of surfactant, the total amount of surfactant injected into the formation being from about 0.1% to 1.0% of the pore volume of the reservoir rock;
   (c) injecting from about 0.75 to 2.5 pore volumes of a second weak salt solution as a driving fluid into the formation after the injection of said surfactant slug, said second weak salt solution having a concentration of about 0.5% to 2.5% by weight.

References Cited

UNITED STATES PATENTS

| | | | |
|---|---|---|---|
| 3,141,501 | 7/1964 | Bernard et al. | 166—9 |
| 3,199,586 | 8/1965 | Henderson et al. | 166—9 |
| 3,246,694 | 4/1966 | Taber et al. | 166—9 |
| 3,258,072 | 6/1966 | Froning | 166—9 |
| 3,289,759 | 12/1966 | Fisher | 166—9 |
| 3,302,713 | 2/1967 | Ahearn et al. | 166—9 |

STEPHEN J. NOVOSAD, *Primary Examiner.*